(12) United States Patent
Kobayashi et al.

(10) Patent No.: US 7,301,862 B2
(45) Date of Patent: Nov. 27, 2007

(54) OPTICAL DISC DRIVE HAVING TILT CONTROLLED OBJECTIVE LENS AND OPTICAL DISC

(75) Inventors: Yoshiharu Kobayashi, Katano (JP); Yasumori Hino, Ikoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 497 days.

(21) Appl. No.: 10/839,675

(22) Filed: May 5, 2004

(65) Prior Publication Data

US 2004/0223426 A1    Nov. 11, 2004

(30) Foreign Application Priority Data

May 8, 2003    (JP)    ............... 2003-130103

(51) Int. Cl.
*G11B 7/00*    (2006.01)
*G02B 27/40*    (2006.01)

(52) U.S. Cl. ............... 369/44.32; 369/53.19; 369/112.23; 250/201.5

(58) Field of Classification Search ............ 369/44.32, 369/53.19, 112.23; 250/201.5; *G11B 7/00; G02B 27/00*
See application file for complete search history.

(56) References Cited

U.S. PATENT DOCUMENTS 5,533,001 A    7/1996    Watanabe et al.

| | | | |
|---|---|---|---|
| 6,221,455 B1 | 4/2001 | Yasuda et al. | |
| 6,345,034 B1 * | 2/2002 | Kim | ............. 369/275.5 |
| 6,511,788 B1 | 1/2003 | Yasuda et al. | |

FOREIGN PATENT DOCUMENTS

| JP | 07-287849 A | 10/1995 |
|---|---|---|
| JP | 2000-030300 A | 1/2000 |

* cited by examiner

*Primary Examiner*—A M Psitos
(74) *Attorney, Agent, or Firm*—Akin Gump Strauss Hauer & Feld LLP

(57) ABSTRACT

An optical disc drive includes an objective lens for focusing light on an optical disc with five or more stacked data storage layers and a tilt control mechanism for controlling a tilt angle defined between the optical axis of the light and a normal to the storage layers. The drive reads and/or writes data from/on a selected one of the storage layers by focusing the light on the selected layer. The numerical aperture NA of the objective lens is defined so as to fall within the range of $1.3009 \times D^3 - 2.9315 \times D^2 + 2.3133 \times D - 0.0502$ to $1.3009 \times D^3 - 2.9315 \times D^2 + 2.3133 \times D + 0.2028$, where D is a distance (mm) from a light incident side of the disc to the deepest one of the storage layers, which is located most distant from the light incident side.

11 Claims, 5 Drawing Sheets

Reflectance of 6.7% or less

FIG.8

OPTICAL DISC DRIVE HAVING TILT CONTROLLED OBJECTIVE LENS AND OPTICAL DISC

BACKGROUND OF THE INVENTION

1. Field of the Invention

The present invention relates to an optical disc including a number of data storage layers that are stacked one upon the other, and to an optical disc drive for reading and/or writing data from/on such an optical disc effectively.

2. Description of the Related Art

The density of data that can be stored on a data storage layer of a given optical disc (which will be referred to herein as a "storage density") is inversely proportional to the area of a beam spot to be formed by a laser beam on the data storage layer in reading or writing data from/on that data storage layer. In this case, the beam spot area is proportional to the square of the spot size of the laser beam. The laser beam spot size is, in turn, proportional to the wavelength of the laser beam and inversely proportional to the numerical aperture NA of an objective lens, which is built in the optical head of an optical disc drive. It should be noted that the "optical disc drive" herein refers to not just read/write drives, players and camcorders for various optical discs but also any other general electronic device as well, as long as the device uses an optical disc as its storage medium.

In a CD (compact disc), which is probably the most known type of optical disc, its compatible objective lens has a numerical aperture NA of 0.45, a laser wavelength of 780 nm and a storage capacity of 650 MB. As for a DVD (digital versatile disc) on the other hand, its compatible objective lens has a numerical aperture NA of 0.6, a laser wavelength of 680 nm and a storage capacity of 4.7 GB. And in a BD (Blu-ray Disc) that has been put on the market just recently, its compatible objective lens has a numerical aperture NA of 0.85, a laser wavelength of 405 nm and as big a storage capacity as 25 GB.

In this manner, the optical discs have increased their storage capacities by leaps and bounds by increasing their numerical apertures NA and shortening their laser wavelengths.

However, it is currently very hard to further increase the numerical aperture NA of the objective lens and make the wavelength of the laser beam even shorter. The reasons are as follows.

Firstly, the numerical aperture NA of an objective lens is represented by the sin function of an angle, which is defined by the focal point and effective radius of the lens. Accordingly, the greater the numerical aperture NA, the narrower the gap between the optical head and the optical disc. For example, if the numerical aperture NA is 0.85, this gap is about 0.1 mm. As the head-to-disc gap narrows in this manner, it becomes increasingly more difficult to control the focal point of the objective lens just as intended.

It is also extremely difficult to further shorten the wavelength of the laser beam because that requires development of a brand-new type of semiconductor devices. As of today, it still looks like a long way off for any semiconductor laser diode to achieve as short an oscillation wavelength as 405 nm, or even less. Somebody suggested using a nonlinear optical element such as a second harmonic generator (SHG) to convert the laser beam radiated from a semiconductor laser diode into a radiation with an even shorter wavelength. Unfortunately, though, this technique is still far from being a realistic idea.

While it is extremely difficult to further increase the numerical aperture NA of the objective lens and make the laser beam wavelength even shorter under circumstances such as these, the development of optical discs with even greater storage capacities is awaited. This is because nowadays the users' demand on storage capacity has gone far beyond the maximum storage capacities of currently available optical discs. For instance, if a 25 GB BD is used to store an HDTV (high definition TV) broadcast program thereon, then just two hours is the limit for a single BD. Meanwhile, as the broadband Internet access and permanent connection has become more and more common service recently for general household users, the quantity of digital data to be provided for them is on a steep rise. For example, if a user continues to receive contents for 24 hours at an average transfer rate of 3 Mbps, then the total quantity of data received will amount to 32 GB. To store such a huge quantity of data, at least two 25 GB BDs are needed.

To overcome these problems, multilayer optical discs are now under research and development. For example, as for a BD, a "two-layered disc" including two data storage layers on a single base member has already been standardized and has a storage capacity of 50 GB. Thus, many people believe a multilayer optical disc is a way to go to increase the storage capacity of an optical disc tremendously.

An optical disc including a number of data storage layers that are stacked on a single base member is disclosed in Japanese Laid-Open Publications No. 2000-235732 and No. 11-195243, for example. According to the techniques disclosed in these documents, to increase the storage capacity of an optical disc, it is indispensable to increase the NA. More specifically, the condition $NA/\lambda \geq 1.20$ must be satisfied.

However, what turned out to be effective in increasing the storage capacity of a single-layer optical disc is not always applicable as it is to increasing the overall storage capacity of a multilayer optical disc. For example, even if the numerical aperture NA of the objective lens is increased, the overall storage capacity does not increase proportionally to the square of the numerical aperture NA. This is because if the numerical aperture NA is increased for a multilayer optical disc, the wave aberrations (such as coma aberration and astigmatism) increase, thus making it more important to define a desired angle between the optical axis of the incoming light and a normal to the data storage layers.

Supposing the tilt angle is constant, the wave aberration (i.e., coma aberration or astigmatism) increases proportionally to the third power of the numerical aperture NA or more. The tilt angle is constantly variable around zero. Accordingly, supposing the tilt angle has a fixed variation range, the decrease in beam spot size due to the increase in numerical aperture NA is canceled by the increase in beam spot size due to the increase in wave aberration. Consequently, unlike the storage capacity of a single-layer optical disc, the overall storage capacity of the respective data storage layers included in a multilayer optical disc does not increase proportionally to the square of the numerical aperture NA.

For that reason, to increase the overall storage capacity (i.e., the sum of the storage capacities) of the respective data storage layers, not just the storage capacity of each single data storage layer but also the number of data storage layers included in one optical disc should be increased. And to increase the number of data storage layers included in a given optical disc, the distance from the light incident side of the optical disc to the deepest one of the data storage layers thereof, which is located most distant from the light incident side (i.e., the storage layer stack thickness) needs to be increased and the interval between adjacent data storage layers needs to be decreased.

However, if the storage layer stack thickness is increased, then the tilt angle will have more and more significant effects. For example, suppose a wave aberration is 34.5 m λ when the storage layer stack thickness is 0.1 mm and the tilt angle is 0.31 degrees. In that case, if the storage layer stack thickness is increased to 0.2 mm with the tilt angle maintained at 0.31 degrees, then the wave aberration will increase to 69 m λ. Stated otherwise, to maintain the wave aberration at 34.5 m λ at a storage layer stack thickness of 0.2 mm, the tilt angle needs to be decreased to 0.155 degrees.

As can be seen, to keep the wave aberration constant, the tilt angle needs to be decreased as the storage layer stack thickness increases. The tilt angle depends on not only the tilt and roughness of the optical disc itself but also the positional relationship between the optical disc and the optical pickup as well. If the tilt angle needs to be decreased, an optical disc drive should include a tilt control mechanism for controlling the tilt angle to zero degrees while an optical disc is subjected to a read or write operation. However, even if such a tilt control mechanism is provided, the tilt angle is still not always equal to zero degrees. This is why if the tilt angle tolerance should be decreased, then the tilt control mechanism needs to perform its control operation even more precisely.

On the other hand, if the storage layer stack thickness is decreased, then the layer-to-layer interval needs to be decreased, too. In such a situation, the crosstalk noise should increase. The crosstalk noise diminishes as the quantity of data covered by a defocused beam on an upper or lower adjacent data storage layer increases.

This is because if the quantity of data, covered by a defocused beam on the adjacent data storage layer, increases, then the ratio of the total area of data pits to that of non-data pits and the quantity of light reflected from the adjacent data storage layer will be closer to their respective constant values.

Conversely, if the numerical aperture NA is increased with the layer-to-layer interval kept constant, then the crosstalk noise decreases. This is because when the numerical aperture NA increases, the defocused beam on an adjacent data storage layer increases not only its size but also the quantity of data included there as well. Accordingly, by increasing the numerical aperture NA, the layer-to-layer interval can be narrowed due to the decrease in crosstalk noise. Furthermore, when the numerical aperture NA is increased, the beam spot size decreases and the storage capacity of each data storage layer increases as described above.

As is clear from the foregoing description, the overall storage capacity (i.e., the sum of the respective storage capacities) of data storage layers in a multilayer optical disc cannot be increased sufficiently just by increasing the numerical aperture NA. Also, if the storage layer stack thickness is decreased with the numerical aperture NA increased, then the increase in aberration can be reduced but the number of data storage layers included needs to be decreased. As a result, the overall storage capacity may not increase.

Thus, to increase the overall storage capacity of a multilayer optical disc, not just the numerical aperture NA and storage layer stack thickness but also other parameters such as a tilt angle tolerance and a layer-to-layer thickness need to be taken into account. In the prior art, however, there are no guidelines on how these parameters should be defined to increase the overall storage capacity effectively. In view of these considerations, if a normal multilayer optical disc is going to include five or more data storage layers in the near future, then the conventional technology will be quite inept at determining the number of data storage layers, numerical aperture NA and other parameters properly.

SUMMARY OF THE INVENTION

In order to overcome the problems described above, an object of the present invention is to provide a method of calculating various parameters appropriately in designing a high-capacity multilayer optical disc with five or more data storage layers.

Another object of the present invention is to provide an optical disc, of which the various parameters have been defined appropriately and the storage capacity of each data storage layer and other target values have been optimized, and an optical disc drive, which is specially designed to process such an optical disc effectively.

An optical disc drive according to a preferred embodiment of the present invention preferably includes an objective lens and a tilt control mechanism. The objective lens preferably focuses light on an optical disc with five or more data storage layers that are stacked one upon the other. The tilt control mechanism preferably controls a tilt angle to be defined between the optical axis of the light and a normal to the data storage layers. The optical disc drive preferably reads and/or writes data from/on a selected one of the data storage layers of the optical disc by focusing the light on the selected data storage layer. The numerical aperture NA of the objective lens is preferably defined so as to fall within the range of $1.3009 \times D^3 - 2.9315 \times D^2 + 2.3133 \times D - 0.0502$ to $1.3009 \times D^3 - 2.9315 \times D^2 + 2.3133 \times D + 0.2028$, where D is a distance (mm) from a light incident side of the optical disc to the deepest one of the data storage layers, which is located most distant from the light incident side.

An optical disc drive according to another preferred embodiment of the present invention preferably includes an objective lens and a tilt control mechanism. The objective lens preferably focuses light on an optical disc with five or more data storage layers that are stacked one upon the other. The tilt control mechanism preferably controls a tilt angle to be defined between the optical axis of the light and a normal to the data storage layers. The optical disc drive preferably reads and/or writes data from/on a selected one of the data storage layers of the optical disc by focusing the light on the selected data storage layer. The tolerance T of the tilt angle and the numerical aperture NA of the objective lens are preferably defined such that the numerical aperture NA falls within the range of $0.7557 \times T^2 - 0.7598 \times T + 0.6462$ to $0.7557 \times T^2 - 0.7598 \times T + 0.8992$.

An optical disc drive according to still another preferred embodiment of the present invention preferably includes an objective lens and a tilt control mechanism. The objective lens preferably focuses light on an optical disc with five or more data storage layers that are stacked one upon the other. The tilt control mechanism preferably controls a tilt angle to be defined between the optical axis of the light and a normal to the data storage layers. The optical disc drive preferably reads and/or writes data from/on a selected one of the data storage layers of the optical disc by focusing the light on the selected data storage layer. The tolerance T of the tilt angle is preferably defined such that a distance D (mm) from a light incident side of the optical disc to the deepest one of the data storage layers, which is located most distant from the light incident side, falls within the range of $-30.031 \times T^3 + 22.321 \times T^2 - 5.9605 \times T + 8.762$ to $6.9155 \times T^3 + 5.4267 \times T^2 + 5.6466 \times T + 1.5795$.

An optical disc drive according to yet another preferred embodiment of the present invention preferably includes an objective lens and a tilt control mechanism. The objective lens preferably focuses light on an optical disc with a number of data storage layers, which are stacked one upon the other and each of which has a reflectance of 6.7% or less. The tilt control mechanism preferably controls a tilt angle to be defined between the optical axis of the light and a normal to the data storage layers. The optical disc drive preferably reads and/or writes data from/on a selected one of the data storage layers of the optical disc by focusing the light on the selected data storage layer. The numerical aperture NA of the objective lens is preferably defined so as to fall within the range of $1.3009 \times D^3 - 2.9315 \times D^2 + 2.3133 \times D - 0.0502$ to $1.3009 \times D^3 - 2.9315 \times D^2 + 2.3133 \times D + 0.2028$, where D is a distance (mm) from a light incident side of the optical disc to the deepest one of the data storage layers, which is located most distant from the light incident side.

An optical disc drive according to yet another preferred embodiment of the present invention preferably includes an objective lens and a tilt control mechanism. The objective lens preferably focuses light on an optical disc with a number of data storage layers, which are stacked one upon the other and each of which has a reflectance of 6.7% or less. The tilt control mechanism preferably controls a tilt angle to be defined between the optical axis of the light and a normal to the data storage layers. The optical disc drive preferably reads and/or writes data from/on a selected one of the data storage layers of the optical disc by focusing the light on the selected data storage layer. The tolerance T of the tilt angle and the numerical aperture NA of the objective lens are preferably defined such that the numerical aperture NA falls within the range of $0.7557 \times T^2 - 0.7598 \times T + 0.6462$ to $0.7557 \times T^2 - 0.7598 \times T + 0.8992$.

An optical disc drive according to yet another preferred embodiment of the present invention preferably includes an objective lens and a tilt control mechanism. The objective lens preferably focuses light on an optical disc with a number of data storage layers, which are stacked one upon the other and each of which has a reflectance of 6.7% or less. The tilt control mechanism preferably controls a tilt angle to be defined between the optical axis of the light and a normal to the data storage layers. The optical disc drive preferably reads and/or writes data from/on a selected one of the data storage layers of the optical disc by focusing the light on the selected data storage layer. The tolerance T of the tilt angle is preferably defined such that a distance D (mm) from a light incident side of the optical disc to the deepest one of the data storage layers, which is located most distant from the light incident side, falls within the range of $-30.031 \times T^3 + 22.321 \times T^2 - 5.9605 \times T + 8.762$ to $6.9155 \times T^3 + 5.4267 \times T^2 + 5.6466 \times T + 1.5795$.

An optical disc according to a preferred embodiment of the present invention preferably includes a number of data storage layers that are stacked one upon the other and is supposed to be loaded into an optical disc drive such that the optical disc drive can read and/or write data from/on a selected one of the data storage layers just as intended by focusing light on that selected data storage layer through an objective lens. The optical disc drive preferably includes the objective lens and a tilt control mechanism for controlling a tilt angle to be defined between the optical axis of the light and a normal to the data storage layers. A distance D (mm) from a light incident side of the optical disc to the deepest one of the data storage layers, which is located most distant from the light incident side, is preferably defined such that the numerical aperture NA of the objective lens falls within the range of $1.3009 \times D^3 - 2.9315 \times D^2 + 2.3133 \times D - 0.0502$ to $1.3009 \times D^3 - 2.9315 \times D^2 + 2.3133 \times D + 0.2028$.

An optical disc according to another preferred embodiment of the present invention preferably includes a number of data storage layers that are stacked one upon the other and is supposed to be loaded into an optical disc drive such that the optical disc drive can read and/or write data from/on a selected one of the data storage layers just as intended by focusing light on that selected data storage layer through an objective lens. The optical disc drive preferably includes the objective lens and a tilt control mechanism for controlling a tilt angle to be defined between the optical axis of the light and a normal to the data storage layers. A distance D (mm) from a light incident side of the optical disc to the deepest one of the data storage layers, which is located most distant from the light incident side, is defined so as to fall within the range of $-30.031 \times T^3 + 22.321 \times T^2 + 5.9605 \times T + 8.762$ to $6.9155 \times T^3 + 5.4267 \times T^2 + 5.6466 \times T + 1.5795$, where T is the tolerance of the tilt angle.

In one preferred embodiment of the present invention, the optical disc preferably includes five or more data storage layers.

In another preferred embodiment, each of the data storage layers preferably has an average reflectance of 6.7% or less.

In still another preferred embodiment, at least one of the data storage layers is preferably made of a photochromic molecular material.

According to various preferred embodiments of the present invention described above, the overall storage capacity of a multilayer optical disc or tilt angle tolerance can be maximized, and the performance of the optical disc can be improved significantly, by optimizing various parameters of the optical disc.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

According to various preferred embodiments of the present invention, a tilt angle tolerance and a layer-to-layer interval are newly introduced as parameters for determining the overall storage capacity of multiple data storage layers stacked in an optical disc. By calculating the overall storage capacity of such a multilayer optical disc with these newly introduced parameters, the respective parameters can be optimized and an optical disc and optical disc drive, which can maximize the tilt angle tolerance and overall storage capacity, are provided.

Before an optical disc and optical disc drive according to specific preferred embodiments of the present invention are described, it will be described how to define those parameters for use in a preferred embodiment of the present invention.

First, the relationship between the "overall storage capacity" defining the quantity of data that can be stored on a single optical disc and other parameters will be analyzed. The overall storage capacity "CAPA_ALL" (GB) is given by the following Equation (1):

$$\text{CAPA\_ALL} = \text{CAPA\_SINGLE} \times (\text{STACK} - \text{COVER}) / \text{INT} \qquad (1)$$

where CAPA_SINGLE is the storage capacity (GB) of a single data storage layer, STACK is the storage layer stack thickness (m), COVER is the thickness (m) of the protective coating, and INT is the layer-to-layer interval (m).

In the exemplary calculations to be described below, when the objective lens of an optical pickup in an optical disc drive has a numerical aperture NA of 0.85, the single-layer storage capacity CAPA_SINGLE is supposed to be 25 GB (as a reference value), which is supposed to change proportionally to the square of the numerical aperture NA.

The layer-to-layer interval INT is a function of the numerical aperture NA. However, to simplify the calculations, the layer-to-layer interval INT is calculated herein by reference to the count of data included in a defocused beam on an adjacent data storage layer when NA is 0.85, the track pitch is 0.32 μm, the data bit length is 111.75 μm, the refractive index of the storage layer stack and protective coating is 1.55 and the gap between the layers is 10 μm. That is to say, if the numerical aperture NA and other parameters have been changed, the count of data included in a defocused beam on an adjacent data storage layer, located just over or under the data storage layer on which the laser beam is focused, is compared with that of data as the reference value. And the layer-to-layer interval at which these counts match each other is defined herein as a layer-to-layer interval limit INT. In the following calculations, the protective coating is supposed to have a constant thickness COVER of 50 μm.

The stack thickness STACK corresponds to the overall thickness of data storage layers in an optical disc as will be described later with reference to FIG. 7, i.e., the storage layer stack thickness 77 of the optical disc 70 shown in FIG. 7. The stack thickness STACK is a function of the tilt angle tolerance (in radians) and numerical aperture NA and is given by the following Equation (2):

$$\text{STACK} = AB \times w / (\text{TILT} \times H_C^{0.5}) \qquad (2)$$

where AB is the tilt aberration tolerance (λ), w is the wavelength (m) and TILT is the tilt angle tolerance (in radians) (see Seiji Nishiwaki, "Theoretical Analysis of Aberration to be Produced on Optical Disc Substrate", Optics Vol. 20, No. 12, the Optical Society of Japan, December 1991. In this example, the tilt aberration tolerance AB is supposed to be equal to the wave aberration of 34.5 m λ. $H_C$ in Equation (2) is an index representing how much the tilt affects the aberration and is given by the following Equation (3):

$$H_C = (F_{0,1} - 2 \times F_{-1,2}/n_0 + F_{-2,3}/n_0^2 - F_{0,1} \times S_C^2) / (2 \times f_{0,1}) \qquad (3)$$

$H_C$ is obtained by substituting the following Equations (4) through (8) for the respective parameters of Equation (3). $F_{-1,2}$ is obtained by substituting Equations (10) and (11) for the respective parameters of Equation (7). $I_{1,-1}$ and $I_{2,-1}$ are obtained by substituting Equation (9) for the respective parameters of Equations (10) and (11).

In the following equations, $n_0$ is the refractive index of the storage layer stack, the inner annular aperture angle α is equal to zero, and the outer annular aperture angle β is equal to $\sin^{-1}$ (NA).

$$SC = 1 - F_{-1,2}/(n_0 \times F_{0,1}) \qquad (4)$$

$$f_{0,1} = -(\cos^2\beta - \cos^2\alpha)/2 \qquad (5)$$

$$F_{0,1} = (\cos^4\beta)/4 - (\cos^2\beta)/2 - (\cos^4\alpha)/4 + (\cos^2\alpha)/2 \qquad (6)$$

$$F_{-1,2} = (n_0/2) \times (I_{1,-1} - I_{2,-1}) \qquad (7)$$

$$F_{-2,3} = (n_0^2/2) \times ((\sin^4\beta - \sin^4\alpha)/2 + (n_0^2 - 1) \times (\sin^2\beta - \sin^2\alpha) + n_0^2(n_0^2 - 1)Ln|(1 - \sin^2\beta/n_0^2)/(1 - \sin^2\alpha/n_0^2)|) \qquad (8)$$

$$I_{0,-1} = Ln|2\sin^2\beta - (n_0^2 + 1) + 2n_0(\cos\beta) \times (1 - (\sin^2\beta)/n_0^2))^{1/2}| - Ln|2\sin^2\alpha - (n_0^2 + 1) + 2n_0(\cos\alpha) \times (1 - (\sin^2\alpha)/n_0^2))^{1/2}| \qquad (9)$$

$$I_{1,-1} = (n_0^2 + 1)I_{0,-1} + n_0(\cos\beta) \times (1 - \sin^2\beta/n_0^2)^{1/2} - n_0(\cos\alpha) \times (1 - \sin^2\alpha/n_0^2)^{1/2} \qquad (10)$$

$$I_{2,-1} = (3n_0^4 + 2n_0^2 + 3)I_{0,-1}/8 + n_0(\cos\beta) \times (1 - \sin^2\beta/n_0^2)^{1/2} \times (2\sin^2\beta + 3(n_0^2 + 1))/4 + n_0(\cos\alpha) \times (1 - \sin^2\alpha/n_0^2)^{1/2} \times (2\sin^2\alpha + 3(n_0^2 + 1))/4 \qquad (11)$$

Figure 1:
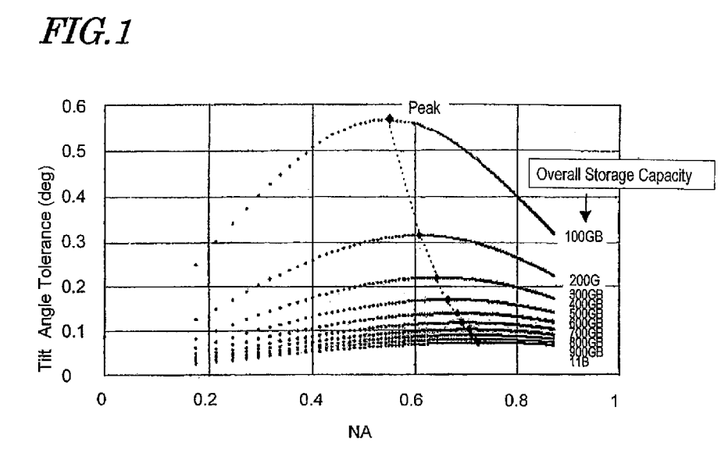
FIG. 1 is a graph showing how the tilt angle tolerance changes with the numerical aperture NA when a given optical disc is supposed to have a constant overall storage capacity.

In accordance with Equation (2) to be defined by these equations, it was estimated how the tilt angle tolerance TILT would change with the numerical aperture NA when the overall storage capacity CAPA_ALL was kept constant. The results are shown in FIG. 1. In FIG. 1, the abscissa represents the numerical aperture NA and the ordinate represents the tilt angle tolerance. In the optical disc drive, the tilt angle is controlled so as not to exceed the tilt angle tolerance. In other words, the control residual of the tilt angle corresponds to the tilt angle tolerance.

The graph of FIG. 1 shows a number of curves, each of which is associated with a unique overall storage capacity (i.e., the sum of the respective storage capacities of the data storage layers) that was kept constant during the estimation. Specifically, in this example, the overall storage capacity was changed from 100 GB to 1 TB at ten steps.

With the overall storage capacity kept constant, as the numerical aperture NA changes, not only the tilt angle tolerance but also layer-to-layer interval, storage layer stack thickness and single-layer storage capacity all change.

Where the numerical aperture NA is relatively small (i.e., in the vicinity of 0.2), the tilt angle tolerance is small. But as the numerical aperture NA increases, the tilt angle tolerance also increases. And when the numerical aperture NA is approximately equal to 0.6 or 0.7, the tilt angle tolerance reaches its maximum value. Thereafter, as the numerical aperture NA further increases, the tilt angle tolerance decreases. Also, the greater the overall storage capacity, the smaller the tilt angle tolerance. That is to say, as the overall storage capacity increases, the tilt angle control residual needs to be smaller and smaller and increasingly strict control is required.

For example, a storage capacity of 200 GB is realized as long as the numerical aperture NA falls within the range of approximately 0.2 to 0.87. If the storage capacity of 200 GB is to be achieved at an NA of 0.3, then the tilt angle tolerance is approximately 0.2 degrees. However, if the storage capacity of 200 GB is to be achieved at an NA of 0.61, then the tilt angle tolerance is approximately 0.314 degrees, which is about 55% greater than approximately 0.2 degrees. The greater the tilt angle tolerance, the lower the tilt detection accuracy and the lower the mechanical precision of an actuator required for the tilt control can be. As a result, the optical disc drive can have a simplified configuration and can be sold at a lower price.

Furthermore, if the storage capacity of 200 GB is to be achieved at an NA of 0.85, then the tilt angle tolerance is approximately 0.25 degrees but the single-layer storage capacity increases, thus raising the transfer rate. Also, the greater the NA, the smaller the beam spot size and the lower the laser power can be.

In this manner, some tradeoff can be made among the tilt angle tolerance, transfer rate and laser power according to the system design specifications (or requirements) of the optical disc drive and optical disc.

Figure 2:
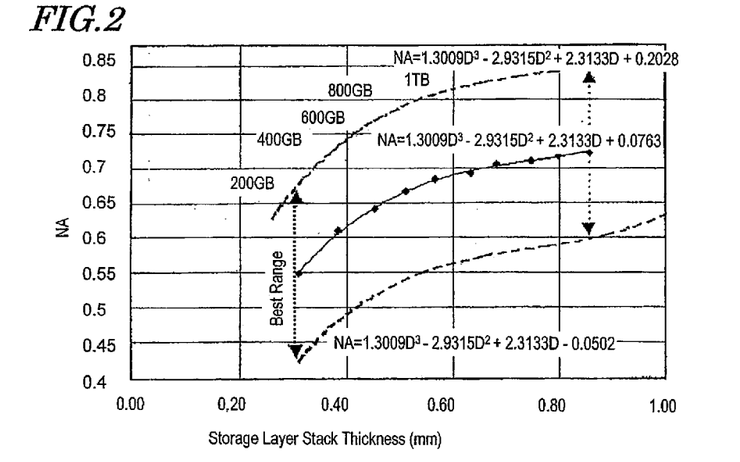
FIG. 2 is a graph showing how the numerical aperture NA changes with the storage layer stack thickness of a given optical disc.

FIG. 2 is a graph showing how the storage layer stack thickness associated with the maximum tilt angle tolerance changes with the numerical aperture NA when the overall storage capacity is supposed to be constant. In FIG. 2, the solid curve at the center of the graph corresponds to the curve connecting the peaks of the respective curves (representing the storage capacities of 100 GB, 200 GB, . . . , and 1 TB) shown in FIG. 1. In FIG. 2, the points on that solid curve also represent the data points associated with the overall storage capacities of 100 GB, 200 GB, . . . , and 1 TB, respectively. This curve satisfies the following Equation (12):

$$NA = 1.3009 D^3 - 2.9315 D^2 + 2.3133 D + 0.0763 \quad (12)$$

where D is the storage layer stack thickness (mm), i.e., the distance from the surface of the disc to the deepest data storage layer.

Suppose how the numerical aperture NA should be defined to maximize the tilt angle tolerance in a situation where the overall storage capacity is fixed at a given value. In that case, first, the peak of the curve representing the given overall storage capacity is located, and the numerical aperture NA associated with that peak is obtained. The numerical aperture NA and tilt angle tolerance obtained in this manner are taken into consideration in designing an optical disc drive. On the other hand, a storage layer stack thickness associated with that numerical aperture NA is obtained by reference to FIG. 2. And an optical disc can be designed according to this storage layer stack thickness.

In an actual system, however, the relationship defined by Equation (12) and represented by the solid curve in FIG. 2 is not always the best. Thus, parameters surrounding the curve given by Equation (12) are adopted according to a combination of margins in each system. For example, by decreasing the tilt angle tolerance, the margins of the other parameters can be broadened. Alternatively, by narrowing the margins of the other parameters, the tilt angle tolerance can be increased. Accordingly, the best NA changes from one system to another. The tradeoff value also differs system by system. As for the NA, the tradeoff value would be±0.125, for example.

In FIG. 2, the dashed curves shown above and below the solid curve represent NAs that are greater and smaller than the NAs of the solid curve by 0.125. The dotted line passing the respective maximum tilt angle tolerances corresponds to the curve associated with a constant overall storage capacity shown in FIG. 1, and therefore, the range sandwiched between the upper and lower dashed curves can be regarded as the best range. That is to say, the range falls between the relationship defined by Equation (1) and the relationship defined by Equation (2).

For example, where the overall storage capacity is 200 GB, the tilt angle tolerance is approximately 0.309 degrees according to the graph of FIG. 1 when NA is around 0.67 (i.e., the intersection between the upper dashed curve and the dotted line representing a capacity of 200 GB in FIG. 2). Accordingly, if NA is equal to 0.67, the tilt control needs to be approximately 1.4% stricter than the situation where NA is equal to 0.61 (associated with a tilt angle tolerance of 0.314 degrees).

However, since NA has increased from 0.61 to 0.67, the beam spot has shrunk and the write power can be cut down by approximately 17%. That is to say, by increasing NA and decreasing the tilt angle tolerance from the relationship defined by Equation (12), some system may compensate for insufficient write power. Also, the storage layer stack thickness decreases by about 0.1 mm from 0.38 mm to 0.28 mm, thus having some effects on the design process of the optical disc and optical head.

Conversely, if NA is set equal to 0.56 (i.e., the intersection between the lower dashed curve and the dotted line representing a capacity of 200 GB in FIG. 2), the tilt angle tolerance is approximately 0.311 degrees, thus making the tilt control strict in this case, too. However, as the NA has been decreased, the proportion of the defocus aberration increases. In addition, since the NA has been decreased, the beam spot size increases. Consequently, no data can be written unless the write power is increased by approximately 19%. Furthermore, the storage layer stack thickness increases by about 0.16 mm from 0.38 mm to 0.54 mm, thus having some effects on the design process of the optical disc and optical head, too.

Such a tradeoff is inevitable not just between the tilt angle tolerance and defocus margin or write power but also between the tilt angle tolerance and any other parameter (e.g., disc thickness error) associated with the tilt angle tolerance or numerical aperture NA.

The example described above relates to a procedure of optimizing other parameters after the overall storage capacity has been fixed first. On the other hand, if the tilt angle tolerance is defined first, the respective parameters may be optimized in the following manner, for example.

Figure 3:
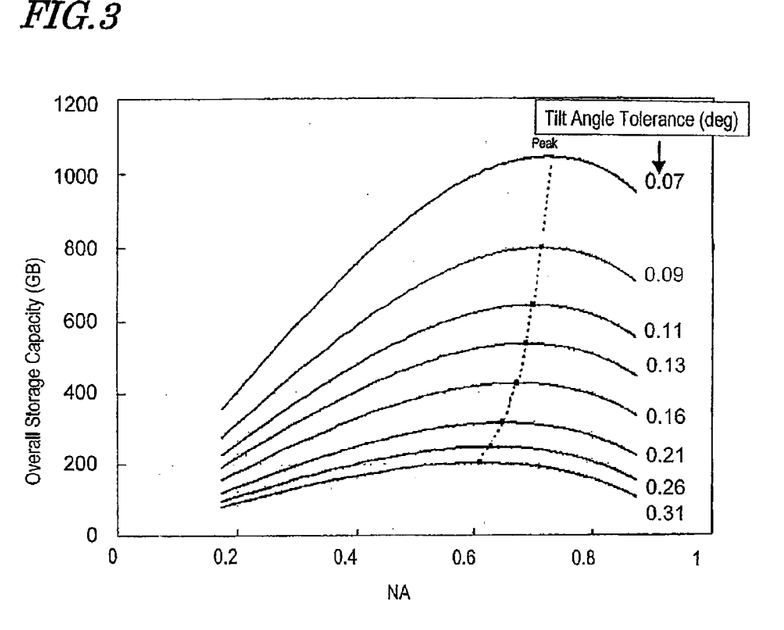
FIG. 3 is a graph showing how the overall storage capacity of a given optical disc changes with the numerical aperture NA when an optical disc drive is supposed to have a constant tilt angle tolerance.

Hereinafter, this procedure will be described with reference to FIGS. 3 and 4. FIG. 3 is a graph showing how the overall storage capacity of a given optical disc changes with the numerical aperture NA when an optical disc drive is supposed to have a constant tilt angle tolerance. In FIG. 3, the abscissa represents the numerical aperture NA while the ordinate represents the overall storage capacity. This graph shows eight curves associated with respective tilt angle tolerances ranging from 0.07 degrees to 0.31 degrees.

The overall storage capacity changes with the numerical aperture NA because the layer-to-layer interval, storage layer stack thickness and single-layer storage capacity are all changeable with the numerical aperture NA. In FIG. 3, the respective parameters change under some restrictions that make the tilt angle tolerance constant.

As can be seen from FIG. 3, when the numerical aperture NA is relatively-small (e.g., NA=approximately 0.2), the overall storage capacity is also small. However, as the numerical aperture NA increases, the overall storage capacity increases. And when the NA becomes equal to around 0.6 to 0.7, the overall storage capacity reaches its peak. Thereafter, as the numerical aperture NA further increases, the overall storage capacity drops.

The reason is that as the numerical aperture NA increases, the single-layer storage capacity increases, the layer-to-layer interval narrows, but the storage layer stack thickness decreases, too. In this manner, the increase in numerical aperture NA affects both the factors increasing the overall storage capacity and the factors decreasing the overall storage capacity. Accordingly, the curves have such peaks as those shown in FIG. 3.

FIG. 3 shows that the decrease in the tilt angle tolerance increases the overall storage capacity. Thus, it can be seen that the overall storage capacity can be increased by performing a tilt control highly precisely with the control residual of the tilt angle decreased.

The overall storage capacity of 200 GB is achievable even with a tilt angle tolerance of 0.31 degrees or less. In that case, however, the NA should be defined within the range of 0.555 to 0.662. On the other hand, if the overall storage capacity of 200 GB should be achieved at a tilt angle tolerance of 0.26 degrees, the numerical aperture NA should be defined within the range of 0.400 to 0.809. Thus, it can be seen that as the setting of the tilt angle tolerance is decreased, the selectable range of the numerical aperture NA expands.

Figure 4:
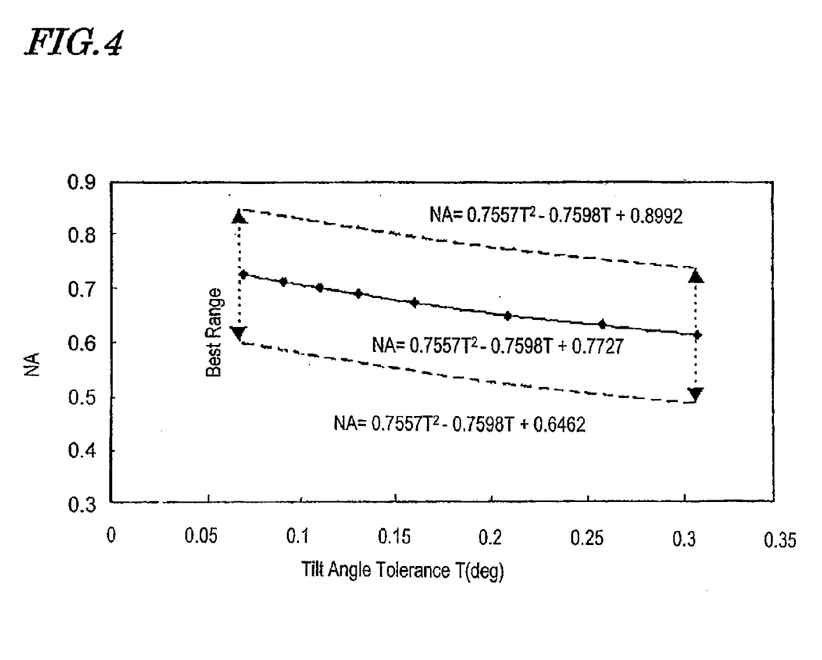
FIG. 4 is a graph showing how the best NA of an optical disc drive changes with the tilt angle tolerance.

FIG. 4 is a graph showing how the tilt angle tolerance changes with the NA that maximizes the overall storage capacity in a situation where the tilt angle tolerance is supposed to be fixed at a constant value. In FIG. 4, the NAs that maximize the overall storage capacities are plotted for the respective tilt angle tolerances of 0.07 degrees through 0.31 degrees shown in FIG. 3. The solid curve shown in FIG. 4 satisfies the following Equation (13):

$$NA=0.7557T^2-0.7598T+0.7727 \quad (13)$$

where T is the tilt angle tolerance.

In the graph of FIG. 4, the dashed curve over the solid curve represents what if the NA has increased from that plotted on the solid curve by 0.125 and the dashed curve under the solid curve represents what if the NA has decreased from that plotted on the solid curve by 0.125.

In an actual optical disc system, however, the relationship defined by Equation (13) is not always the best. Thus, parameters surrounding the curve given by Equation (13) are adopted according to a combination of margins in each system. For example, by decreasing the overall storage capacity, the margins of the other parameters can be broadened. Alternatively, by narrowing the margins of the other parameters, the overall storage capacity can be increased. Accordingly, the best NA changes from one optical disc system to another. The allowable NA range, which is subject to change with the tradeoff, also differs system by system. For example, that range may be±0.125 from the value given by Equation (13). Suppose how much tradeoff should be made to achieve an overall storage capacity of 200 GB or more. If the tilt angle tolerance is 0.26 degrees, the NA can fall within the range of 0.400 to 0.809. When the numerical aperture NA is equal to 0.628, the overall storage capacity reaches its peak value of 248 GB.

Suppose the overall storage capacity of 200 GB should be achieved at the NA of 0.809. In that case, the numerical aperture NA increases from 0.628 to 0.809, the beam spot shrinks and the laser power for writing can be cut down by approximately 66%. That is to say, by increasing NA from the value defined by Equation (13), some system may be allowed to decrease the overall storage capacity to a certain degree, thus compensating for insufficient write power. Also, if the numerical aperture NA is increased in this manner, the storage layer stack thickness decreases from 0.413 mm to 0.150 mm, thus having some effects on the design process of the optical disc and optical head.

Conversely, if the numerical aperture NA is decreased to 0.400, the defocus aberration increases. In addition, if the NA is decreased, the beam spot size increases. Consequently, no data can be written unless the laser power is increased approximately 2.46 times. Furthermore, when the numerical aperture NA decreases, the storage layer stack thickness increases from 0.413 mm to 1.93 mm.

An NA of 0.6 is defined for DVDs, while an NA of 0.45 is defined for CDs. Accordingly, to ensure compatibility with DVDs, the numerical aperture NA is preferably defined at 0.6. On the other hand, if the compatibility with CDs needs to be respected, the numerical aperture NA is preferably defined at 0.45.

If the configuration of the optical disc drive should be as simple as possible, then the tilt angle tolerance is preferably maximized. In that case, by setting the numerical aperture NA equal to 0.608, the overall storage capacity of 200 GB is achievable even if the tilt angle tolerance is 0.31 degrees.

As in the example shown in FIG. 2, such a tradeoff is inevitable not just between the overall storage capacity and the tilt angle tolerance but also between the overall storage capacity and any other parameter (e.g., defocus margin, write power or disc thickness error) associated with the overall storage capacity or numerical aperture NA. Accordingly, the range between the curves represented by Equations (3) and (4) is adopted as the best parameter range.

Figure 5:
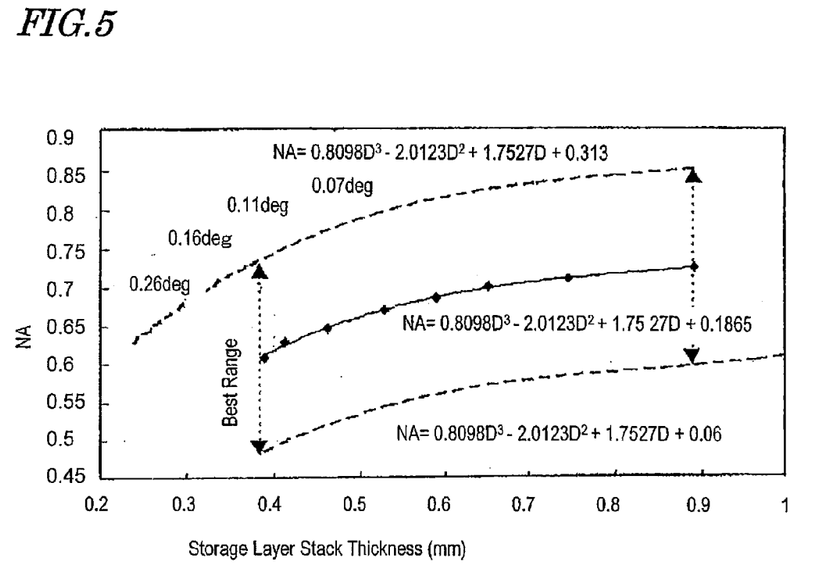
FIG. 5 is a graph showing how the best NA of an optical disc drive changes with the storage layer stack thickness of a given optical disc.

FIG. 5 is a graph obtained by converting the abscissa of FIG. 4 into the storage layer stack thickness. That is to say, the solid curve at the center of FIG. 5 represents a relationship between the storage layer stack thickness, corresponding to each point on the solid curve shown in FIG. 4, and the numerical aperture NA. The solid curve shown in FIG. 4 is obtained by plotting the peaks of the overall storage capacity when the tilt angle tolerance is fixed at a constant value as shown in FIG. 3. In FIG. 5, the dashed curves shown above and below the solid curve are obtained by adding margins of±0.125 to the numerical aperture NA represented by the solid curve.

When the overall storage capacity is decreased, the margins of other parameters can be expanded. Accordingly, the best numerical aperture NA changes from one optical disc system to another. However, the best NA range to maximize the overall storage capacity is included in the range between the upper and lower dashed curves.

In FIG. 5, the dashed curve connecting together the points that are associated with the tilt angle tolerances of 0.26 degrees, 0.16 degrees, 0.11 degrees and 0.07 degrees corresponds to the curves on which the tilt angle tolerances are fixed at 0.26 degrees, 0.16 degrees, 0.11 degrees and 0.07 degrees, respectively, in FIG. 3. Accordingly, as in the example shown in FIG. 2, the dotted line passing the respective tilt angle tolerances corresponds to the curve associated with a constant tilt angle tolerance shown in FIG. 3, and therefore, the range sandwiched between the upper and lower dashed curves can be regarded as the best NA range.

Figure 6:
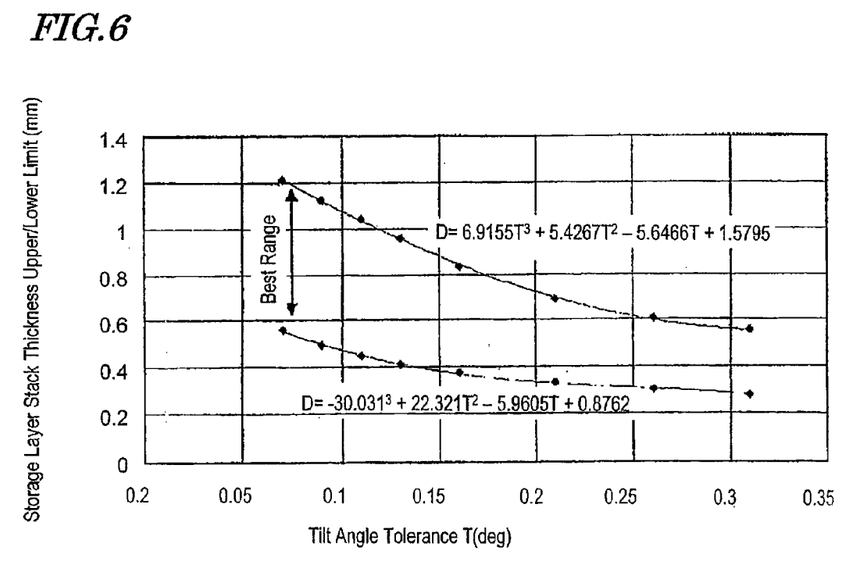
FIG. 6 is a graph showing how the storage layer stack thickness of a given optical disc changes with the best tilt angle tolerance of an optical disc drive.

FIG. 6 is a graph showing how the storage layer stack thickness changes with the tilt angle tolerance on each of the upper and lower dashed curves defining the best NA range in FIG. 5. That is to say, the graph of FIG. 6 is obtained by plotting the intersections between the upper and lower dashed curves shown in FIG. 5 and the dotted lines, each being associated with a constant tilt angle tolerance.

The upper solid curve shown in FIG. 6 corresponds to the lower dashed curve in FIG. 5, which is obtained by subtracting about 0.125 from the numerical aperture NA represented by the central solid curve shown in FIG. 5 (i.e., showing the peak overall storage capacities). On the other hand, the lower solid curve shown in FIG. 6 corresponds to the upper dashed curve in FIG. 5, which is obtained by adding about 0.125 to the numerical aperture NA represented by the central solid curve shown in FIG. 5 (i.e., showing the peak overall storage capacities). The best storage layer stack thickness range to maximize the overall storage capacity is the range between the two curves shown in FIG. 6 (i.e., the range defined between the relationships represented by Equations (5) and (6)).

Hereinafter, preferred embodiments of the present invention will be described with reference to the accompanying drawings.

Embodiment 1

First, a configuration for an optical disc according to a specific preferred embodiment of the present invention will be described with reference to FIG. 7.

Figure 7:
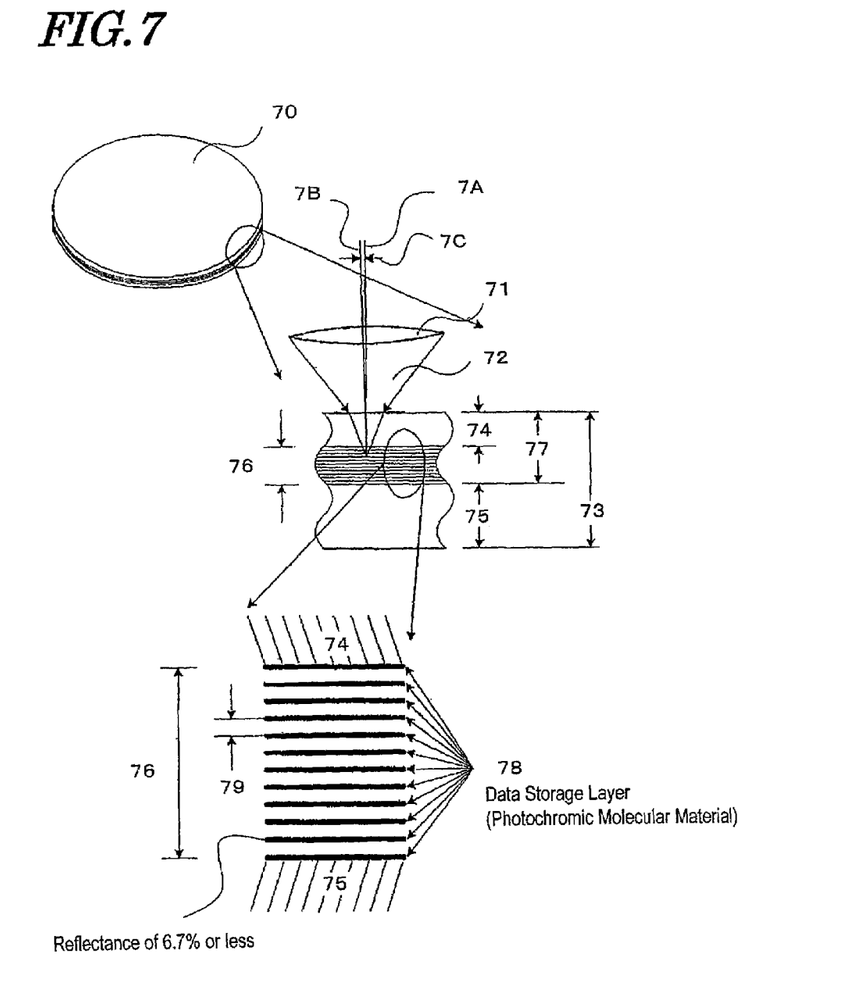
FIG. 7 is a schematic representation illustrating an optical disc drive according to a first specific preferred embodiment of the present invention.

As shown in FIG. 7, an optical disc 70 according to this preferred embodiment preferably includes a protective coating 74, a stack 76 of data storage layers, and a base substrate 75, which are stacked one upon the other in this order such that the protective coating 74 is closest to the incoming light. A laser beam 72 is focused by an objective lens 71, which is included in an optical system of an optical disc drive, onto the stack 76 of data storage layers of the optical disc 70.

In the optical disc 70 of this preferred embodiment, the stack 76 of data storage layers includes at least five, and preferably ten or more, data storage layers 78. The average reflectance of each of these data storage layers 78 (i.e., the average of reflectances at the wavelength of a laser beam for use to perform read and write operations) changes with the total number of data storage layers to be stacked. In a preferred embodiment of the present invention, the average reflectance is preferably 6.7% or less. If the total number of data storage layers is further increased (to more than ten, for example), the average reflectance of each data storage layer is preferably set to 3% or less. As used herein, the "average reflectance" refers to the reflectance of a data storage layer in a situation where the overall area of portions with recording marks is equal to that of unwritten portions on a given track. The reflectance of a given data storage layer is measured by the method described in Annex D of ECMA International Standard ECMA-338.

In FIG. 7, the interval between one of the data storage layers 78 included in this stack 76 and another one that is located just over or under the former layer 78 is identified by the reference numeral 79. If a great number of data storage layers 78 are stacked one upon the other, then each of those data storage layers 78 is preferably made of not so much a conventional phase change material as an organic material (such as a photochromic molecular material) to cause a photochemical reaction upon exposure to a pulsed laser beam (e.g., photochromic diarylethene or photo-addressable polymer (PAP)).

The distance from the light incident side of the optical disc 70 to the deepest one of the data storage layers 78, which is located most distant from the light incident side, will be referred to herein as the "storage layer stack thickness 77", while the sum of the storage layer stack thickness 77 and the thickness of the base substrate 75 is defined herein as the "disc thickness".

Also, a line drawn perpendicularly to the data storage layer 78, on which the focal point of the laser beam 72 is located, will be referred to herein as a "data storage layer normal 7A", and the angle defined between the optical axis 7B of an objective lens and the data storage layer normal 7A is defined herein as a "tilt angle 7C".

The laser beam 72 passes the protective coating 74 so as to be focused on one of the data storage layers 78 in the stack 76. In reading or writing data from/on any of the data storage layers 78 but the data storage layer 78 located closest to the objective lens 71, the laser beam 72 should pass at least one data storage layer 78. Accordingly, the laser beam 72 is partially reflected by that at least one data storage layer 78.

If such unintentionally reflected light passes through the objective lens 71 and enters a photodetector, then crosstalk noise is produced.

The magnitude of the crosstalk noise increases or decreases according to the ratio of the total area of data pits to that of non-data pits that are included in the beam spot of the laser beam 72, which is defocused with respect to the data storage layer(s) 78 causing the unwanted reflection. This is because the reflectance of those data pits is different from that of the non-data pits. As the beam spot of the defocused laser beam on that data storage layer 78 increases its size, the ratio of the total area of the data pits to that of the non-data pits becomes closer to one. As a result, the variation in the quantity of light reflected among respective points of incidence, and eventually the crosstalk noise, decrease.

This is why the wider the layer-to-layer interval 79 and the greater the NA of the objective lens 71, the smaller the crosstalk noise.

In this preferred embodiment, the tilt angle tolerance and the numerical aperture NA of the objective lens 71 are preferably defined so as to satisfy the relationship already described with reference to FIG. 1.

That is to say, supposing the storage layer stack thickness 77 is identified by D (mm), the numerical aperture NA of the objective lens 71 is defined so as to satisfy the inequality:

$$1.3009 \times D^3 - 2.9315 \times D^2 + 2.3133 \times D - 0.0502 \leq NA \leq 1.3009 \times D^3 - 2.9315 \times D^2 + 2.3133 \times D + 0.2028 \quad (14)$$

In an optical disc drive with such a configuration, the tilt control mechanism thereof may have a simplified structure because the tilt angle tolerance T is maximized.

In this preferred embodiment, the overall storage capacity of a given optical disc is the sum of the respective storage capacities of the data storage layers 78 included in the stack 76.

As can be seen from FIG. 1, as the numerical aperture NA is increased from around 0.2, the tilt angle tolerance increases, which means that the optical disc drive does not have to control the tilt angle so precisely. That is to say, a mechanism for decreasing the tilt can have a simplified configuration. Also, as the NA increases, the crosstalk noise decreases, thus decreasing the layer-to-layer interval 79 and the storage layer stack thickness 77. Furthermore, as the NA increases from around 0.2, the beam spot of the laser beam on the data storage layer decreases its size. As a result, the storage capacity of each data storage layer 78 (which will be referred to herein as a "single-layer storage capacity") increases. And when the NA becomes approximately equal to 0.6 or 0.7, the tilt angle tolerance reaches its peak. Thereafter, as the NA increases, the tilt angle tolerance decreases.

In this preferred embodiment, in performing a control operation such that the tilt angle 7C becomes as close to zero degrees as possible, the NA of the objective lens 71 and the storage layer stack thickness 77 are determined so as to maximize the control residual (i.e., the tilt angle tolerance).

As described above, supposing the tilt angle tolerance T is constant, the overall storage capacity (i.e., the sum of the respective storage capacities of the data storage layers 78 in the stack 76) preferably changes with the numerical aperture NA of the objective lens 71 as shown in FIG. 3. That is to say, as the numerical aperture NA is increased from around 0.2, the overall storage capacity increases. In the meantime, the storage layer stack thickness 77 and the layer-to-layer interval 79 decrease while the single-layer storage capacity increases.

This is because the density of a data storage layer of an optical disc is generally inversely proportional to the beam spot size and because the beam spot size is inversely proportional to the square of NA. And when the NA becomes approximately equal to 0.6 or 0.7, the overall storage capacity reaches its peak. After that, even if the NA is increased, the overall storage capacity goes on decreasing.

If the tilt angle tolerance T and the numerical aperture NA of the objective lens 71 satisfy the inequality:

$$0.7557 \times T^2 - 0.7598 \times T + 0.6462 \leq NA \leq 0.7557 \times T^2 - 0.7598 \times T + 0.8992 \quad (15)$$

then the overall storage capacity can be maximized at a given tilt angle tolerance T.

Also, if the tilt angle tolerance T and the storage layer stack thickness D satisfy the inequality:

$$-30.031 \times T^3 + 22.321 \times T^2 - 5.9605 \times T + 8.762 \leq D \leq 6.9155 \times T^3 + 5.4267 \times T^2 - 5.6466 \times T + 1.5795 \quad (16)$$

then the overall storage capacity can also be maximized at a given tilt angle tolerance T.

Embodiment 2

Figure 8:
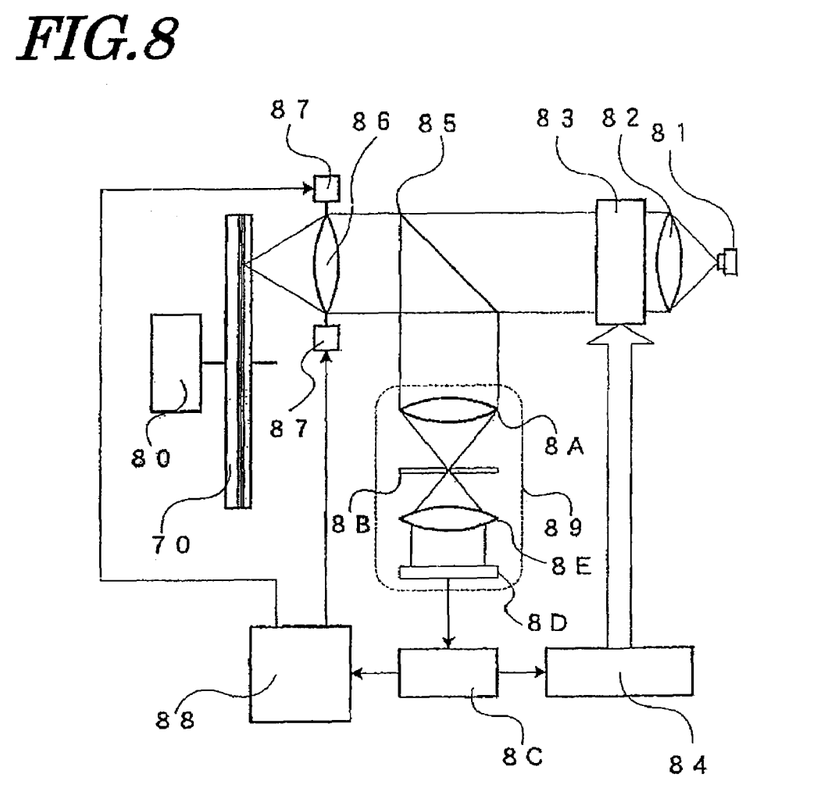
FIG. 8 is a schematic representation illustrating an optical disc drive according to a second specific preferred embodiment of the present invention.

FIG. 8 illustrates an optical disc drive according to a second specific preferred embodiment of the present invention.

In the optical disc drive of this preferred embodiment, a laser beam that has been radiated from a laser diode 81 is transformed by a collimator lens 82 into a parallel beam, which is then incident on a liquid crystal panel 83. The liquid crystal panel 83 may be the element described in the article entitled "A Liquid Crystal Microlens Obtained with a Non-Uniform Electric Field", Liquid Crystals 1989, Vol. 5, pp. 1425–1433, for example.

In response to a signal supplied from a spherical aberration correcting controller 84, the liquid crystal panel 83 can give the parallel beam an aberration that cancels the spherical aberration. The light given by such a liquid crystal panel 83 to the parallel beam is called "conjugate light". The conjugate light transmits a half mirror 85, passes an objective lens 86 and then enters the optical disc 70. As in the optical disc 70 of the first preferred embodiment described above, the optical disc 70 of the second preferred embodiment also has a number of data storage layers 78 as shown in FIG. 7.

The laser beam is reflected by one of the data storage layers included in the optical disc 70, transmitted through the objective lens 86 again and returned to the half mirror 85. The light reflected from the data storage layer of the optical disc 70 comes to have a spherical aberration while being transmitted through the optical disc 70. In this preferred embodiment, the magnitude of such a spherical aberration is estimated in advance and the conjugate light is produced by the liquid crystal panel 83 so as to cancel the spherical aberration. Thus, the spherical aberration can be reduced significantly according to this preferred embodiment. Even so, some aberration still remains since the spherical aberration cannot be canceled completely.

The light that has been reflected from the optical disc 70 is further reflected by the half mirror 85 to enter a point diffraction interferometer (PDI) aberration sensor 89. Such a PDI aberration sensor 89 is described in Introduction to Wavefront Sensors, SPIE, p. 56, for example.

On entering the PDI aberration sensor 89, the light is converged by a focusing lens 8A onto a PDI substrate 8B. A pinhole is provided at the center of the PDI plate 8B and surrounded with a semi-transparent material. Accordingly, the PDI substrate 8B can function both as a pinhole and a semi-transparent plate alike. The light that has been transmitted through the PDI substrate 8B is then collimated by an imaging lens 8E to enter a CCD sensor 8D.

The light that has passed through the pinhole has no aberration, whereas the light that has been transmitted through the semi-transparent plate does have aberration. Accordingly, the light with no aberration interferes with the light with aberration, thereby producing interference fringes on the CCD sensor 8D. By getting the pattern of these interference fringes detected by the CCD sensor 8D, an aberration calculator 8C can obtain the aberration. The spherical aberration correcting controller 84 receives the output of the aberration calculator 8C and controls the liquid crystal panel 83 so as to minimize the spherical aberration that has been detected by the CDD sensor 8D.

A signal representing the magnitude of tilt aberration, also calculated by the aberration calculator 8C, is output to an actuator controller 88. In response, the actuator controller 88 controls an actuator 87 so as to reduce the magnitude of tilt aberration to as close to zero as possible. In accordance with the output signal of the actuator controller 88, the actuator 87 can change the biaxial tilt angle.

The aberration calculator 8C further outputs a signal representing the magnitude of defocusing aberration to the actuator controller 88. In response, the actuator controller 88 minimizes the magnitude of defocusing produced by the objective lens 86.

In the optical disc drive of this preferred embodiment, the actuator controller 88 and actuator 87 perform the control operation so as to reduce the tilt angle 7C as close to zero as possible in accordance with the magnitude of tilt aberration that has been detected by the PDI aberration sensor 89 and aberration calculator 8C.

The optical disc drive of this preferred embodiment can also maximize the overall storage capacity of a multilayer optical disc by satisfying the inequalities (15) and (16) mentioned above. Also, if the tilt angle tolerance needs to be increased as much as possible in the optical disc drive, then the numerical aperture NA should be defined so as to satisfy the following inequality:

$$1.3009 \times D^3 - 2.9315 \times D^2 + 2.3133 \times D - 0.0502 \leq NA \leq 1.3009 \times D^3 - 2.9315 \times D^2 + 2.3133 \times D + 0.2028 \quad (17)$$

In the preferred embodiments described above, the various parameters are calculated on the supposition that the photochemical reaction of photochromic diarylethene or PAP, which causes the storage of data in a storage layer, advances proportionally to the intensity of the laser light. However, those parameters may also be calculated similarly even in a 2-photon absorption recording operation in which the photochemical reaction of the photochromic diarylethene or PAP advances proportionally to the square of the intensity of the light.

Various preferred embodiments of the present invention described above provide a multilayer optical disc, of which the storage capacity is maximized using a tilt angle tolerance and layer-to-layer interval as parameters, and also provide an optical disc drive that is specially designed to process such a multilayer optical disc effectively.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2003-130103 filed on May 8, 2003 and No. 2004-131027 filed on Apr. 27, 2004, the entire contents of which are hereby incorporated by reference.

What is claimed is:

1. An optical disc drive comprising
an objective lens for focusing light on an optical disc with five or more data storage layers that are stacked one upon the other and
a tilt control mechanism for controlling a tilt angle to be defined between the optical axis of the light and a normal to the data storage layers,
the optical disc drive reading and/or writing data from/on a selected one of the data storage layers of the optical disc by focusing the light on the selected data storage layer,
wherein the numerical aperture NA of the objective lens is defined so as to fall within the range of $1.3009 \times D^3 - 2.9315 \times D^2 + 2.3133 \times D - 0.0502$ to $1.3009 \times D^3 - 2.9315 \times D^2 + 2.3133 \times D + 0.2028$, where D is a distance (mm) from a light incident side of the optical disc to the deepest one of the data storage layers, which is located most distant from the light incident side.

2. An optical disc drive comprising
an objective lens for focusing light on an optical disc with five or more data storage layers that are stacked one upon the other and
a tilt control mechanism for controlling a tilt angle to be defined between the optical axis of the light and a normal to the data storage layers,
the optical disc drive reading and/or writing data from/on a selected one of the data storage layers of the optical disc by focusing the light on the selected data storage layer,
wherein the tolerance T of the tilt angle and the numerical aperture NA of the objective lens are defined such that the numerical aperture NA falls within the range of $0.7557 \times T^2 - 0.7598 \times T + 0.6462$ to $0.7557 \times T^2 - 0.7598 \times T + 0.8992$.

3. An optical disc drive comprising
an objective lens for focusing light on an optical disc with five or more data storage layers that are stacked one upon the other and
a tilt control mechanism for controlling a tilt angle to be defined between the optical axis of the light and a normal to the data storage layers,
the optical disc drive reading and/or writing data from/on a selected one of the data storage layers of the optical disc by focusing the light on the selected data storage layer,
wherein the tolerance T of the tilt angle is defined such that a distance D (mm) from a light incident side of the optical disc to the deepest one of the data storage layers, which is located most distant from the light incident side, falls within the range of $-30.031 \times T^3 + 22.321 \times T^2 - 5.9605 \times T + 8.762$ to $6.9155 \times T^3 + 5.4267 \times T^2 + 5.6466 \times T + 1.5795$.

4. An optical disc drive comprising
an objective lens for focusing light on an optical disc with a number of data storage layers, which are stacked one upon the other and each of which has a reflectance of 6.7% or less, and
a tilt control mechanism for controlling a tilt angle to be defined between the optical axis of the light and a normal to the data storage layers,
the optical disc drive reading and/or writing data from/on a selected one of the data storage layers of the optical disc by focusing the light on the selected data storage layer,
wherein the numerical aperture NA of the objective lens is defined so as to fall within the range of $1.3009 \times D^3 - 2.9315 \times D^2 + 2.3133 \times D - 0.0502$ to $1.3009 \times D^3 - 2.9315 \times D^2 + 2.3133 \times D + 0.2028$, where D is a distance (mm) from a light incident side of the optical disc to the deepest one of the data storage layers, which is located most distant from the light incident side.

5. An optical disc drive comprising
an objective lens for focusing light on an optical disc with a number of data storage layers, which are stacked one upon the other and each of which has a reflectance of 6.7% or less, and
a tilt control mechanism for controlling a tilt angle to be defined between the optical axis of the light and a normal to the data storage layers,
the optical disc drive reading and/or writing data from/on a selected one of the data storage layers of the optical disc by focusing the light on the selected data storage layer,
wherein the tolerance T of the tilt angle and the numerical aperture NA of the objective lens are defined such that the numerical aperture NA falls within the range of $0.7557 \times T^2 - 0.7598 \times T + 0.6462$ to $0.7557 \times T^2 - 0.7598 \times T + 0.8992$.

6. An optical disc drive comprising
an objective lens for focusing light on an optical disc with a number of data storage layers, which are stacked one upon the other and each of which has a reflectance of 6.7% or less, and
a tilt control mechanism for controlling a tilt angle to be defined between the optical axis of the light and a normal to the data storage layers, the optical disc drive reading and/or writing data from/on a selected one of the data storage layers of the optical disc by focusing the light on the selected data storage layer, wherein the tolerance T of the tilt angle is defined such that a distance D (mm) from a light incident side of the optical disc to the deepest one of the data storage layers, which is located most distant from the light incident side, falls within the range of $-30.031 \times T^3 + 22.321 \times T^2 - 5.9605 \times T + 8.762$ to $6.9155 \times T^3 + 5.4267 \times T^2 + 5.6466 \times T + 1.5795$.

7. An optical disc, which includes a number of data storage layers that are stacked one upon the other and which is loaded into an optical disc drive such that the optical disc drive reads and/or writes data from/on a selected one of the data storage layers just as intended by focusing light on that selected data storage layer through an objective lens, the optical disc drive comprising the objective lens and a tilt control mechanism for controlling a tilt angle to be defined between the optical axis of the light and a normal to the data storage layers, wherein a distance D (mm) from a light incident side of the optical disc to the deepest one of the data storage layers, which is located most distant from the light incident side, is defined such that the numerical aperture NA of the objective lens falls within the range of $1.3009 \times D^3 - 2.9315 \times D^2 + 2.3133 \times D - 0.0502$ to $1.3009 \times D^3 - 2.9315 \times D^2 + 2.3133 \times D + 0.2028$.

8. An optical disc, which includes a number of data storage layers that are stacked one upon the other and which is loaded into an optical disc drive such that the optical disc drive reads and/or writes data from/on a selected one of the data storage layers just as intended by focusing light on that selected data storage layer through an objective lens, the optical disc drive comprising the objective lens and a tilt control mechanism for controlling a tilt angle to be defined between the optical axis of the light and a normal to the data storage layers, wherein a distance D (mm) from a light incident side of the optical disc to the deepest one of the data storage layers, which is located most distant from the light incident side, is defined so as to fall within the range of $-30.031 \times T^3 + 22.321 \times T^2 + 5.9605 \times T + 8.762$ to $6.9155 \times T^3 + 5.4267 \times T^2 + 5.6466 \times T + 1.5795$, where T is the tolerance of the tilt angle.

9. The optical disc of claim 7, wherein the optical disc includes five or more data storage layers.

10. The optical disc of claim 7, wherein each of the data storage layers has an average reflectance of 6.7% or less.

11. The optical disc of claim 7, wherein at least one of the data storage layers is made of a photochromic molecular material.

\* \* \* \* \*